(12) United States Patent
Yamazaki et al.

(10) Patent No.: US 7,884,510 B2
(45) Date of Patent: Feb. 8, 2011

(54) SMALL-SIZED MOTOR

(75) Inventors: Hiroshi Yamazaki, Matsudo (JP); Hiroyuki Masutani, Matsudo (JP); Masafumi Momma, Matsudo (JP); Junichi Harano, Matsudo (JP)

(73) Assignee: Mabuchi Motor Co. Ltd., Chiba (JP)

( * ) Notice: Subject to any disclaimer, the term of this patent is extended or adjusted under 35 U.S.C. 154(b) by 83 days.

(21) Appl. No.: 12/520,216

(22) PCT Filed: Dec. 21, 2007

(86) PCT No.: PCT/JP2007/074629
§ 371 (c)(1),
(2), (4) Date: Jun. 19, 2009

(87) PCT Pub. No.: WO2008/078671
PCT Pub. Date: Jul. 3, 2008

(65) Prior Publication Data
US 2009/0322188 A1  Dec. 31, 2009

(30) Foreign Application Priority Data
Dec. 27, 2006  (JP) .............................. 2006-352348

(51) Int. Cl.
*H02K 5/00* (2006.01)
(52) U.S. Cl. ................. 310/40 MM; 310/234
(58) Field of Classification Search ........... 310/40 MM, 310/233, 234, 241
See application file for complete search history.

(56) References Cited

U.S. PATENT DOCUMENTS 4,618,794 A * 10/1986 Rampignon ................. 310/234
2007/0152532 A1 * 7/2007 Roos et al. .................. 310/234

FOREIGN PATENT DOCUMENTS

| JP | 62-230340 | 10/1987 |
| JP | 63-302751 | 12/1988 |
| JP | 2001-45731 | 2/2001 |

* cited by examiner

*Primary Examiner*—Nguyen N Hanh
(74) *Attorney, Agent, or Firm*—McGlew & Tuttle, P.C.

(57) ABSTRACT

The present invention is used with a stopper mechanism for mechanically stopping the rotation of a motor. A pair of brushes is disposed such that a line which passes through the center of a rotor and connects the centers of the paired brushes is offset by a predetermined angle from a line which connects the centers of paired magnets. A commutator is disposed in such a manner as to be offset from a reference position by the same angle as the predetermined angle by which the paired brushes are offset. The predetermined angle falls within a range between an angle obtained by dividing 70° by the number of pairs of stator poles and an angle obtained by dividing 290° by the number of pairs of stator poles. Specifically, in the case of two stator poles, the predetermined angle falls within a range of 70° to 290° inclusive. In the case of four stator poles, the predetermined angle falls within a range of 35° to 145° inclusive.

4 Claims, 10 Drawing Sheets

30° ARRANGEMENT

FIG. 7A
0° ARRANGEMENT

FIG. 7B
30° ARRANGEMENT

FIG. 7C
120° ARRANGEMENT

VIEW OF END BELL

VIEW OF ROTOR

CORE SALIENT
SLIT
ARM

CONNECTION DIAGRAM

COMMUTATOR SEGMENT
CORE SALIENT

FIG. 8

PRODUCTION OF UNUSUAL NOISE VS. BRUSH CONTACT POSITION AT THE TIME OF LOCK

| ANGLE | | INITIAL STAGE | 10,000 CYCLES | 25,000 CYCLES |
|---|---|---|---|---|
| 0 |  0° | 370.8 | 2665.2 | 1313 |
| 30 |  30° | 701.6 | 1348.8 | 2695 |
| 90 |  90° | 74.4 | 261.9 | 550 |
| 120 |  120° | 0.0 | 88.1 | 181.6 |
| 150 |  150° | 0.0 | 0.0 | 60.0 |
| 180 |  180° | 0.0 | 0.0 | 0.0 |
| 210 |  210° | 0.0 | 124.0 | 234.0 |
| 270 |  270° | 44.0 | 264.0 | 659.0 |
| 300 |  300° | 38.3 | 1551.7 | 1751.7 |
| 360 |  0° | 370.8 | 2665.2 | 1313 |

FIG. 9

FIG. 10A
0° ARRANGEMENT

FIG. 10B
15° ARRANGEMENT

FIG. 10C
60° ARRANGEMENT

FIG. 11

SMALL-SIZED MOTOR

TECHNICAL FIELD

The present invention relates to a small-sized motor featuring reduced unusual noise produced at the time of mechanical stop of its rotation by a stop mechanism.

BACKGROUND ART

Small-sized motors are used widely in automotive electric equipment, such as automotive door locking-unlocking devices and motor-driven mirror retractors. Some of the small-sized motors are driven by means of turning on power for only a predetermined period of time. Such a small-sized motor stops rotating by the action of a mechanical stopper after achievement of a motor function, such as door locking, and before power is turned off. Usually, in order to reliably achieve a motor function under various conditions, a motor power ON period is set such that power is turned off after elapse of a slight period of time after the motor stops rotating (the motor is locked) by the action of a mechanical stopper. In other words, after a small-sized motor stops rotating by the action of a stopper, power is still supplied for a certain period of time. It has been revealed that, as a result of supply of power after the motor stops rotating, the motor vibrates and thus produces unusual noise. The produced unusual noise continues until motor power goes off.

Figure 11:
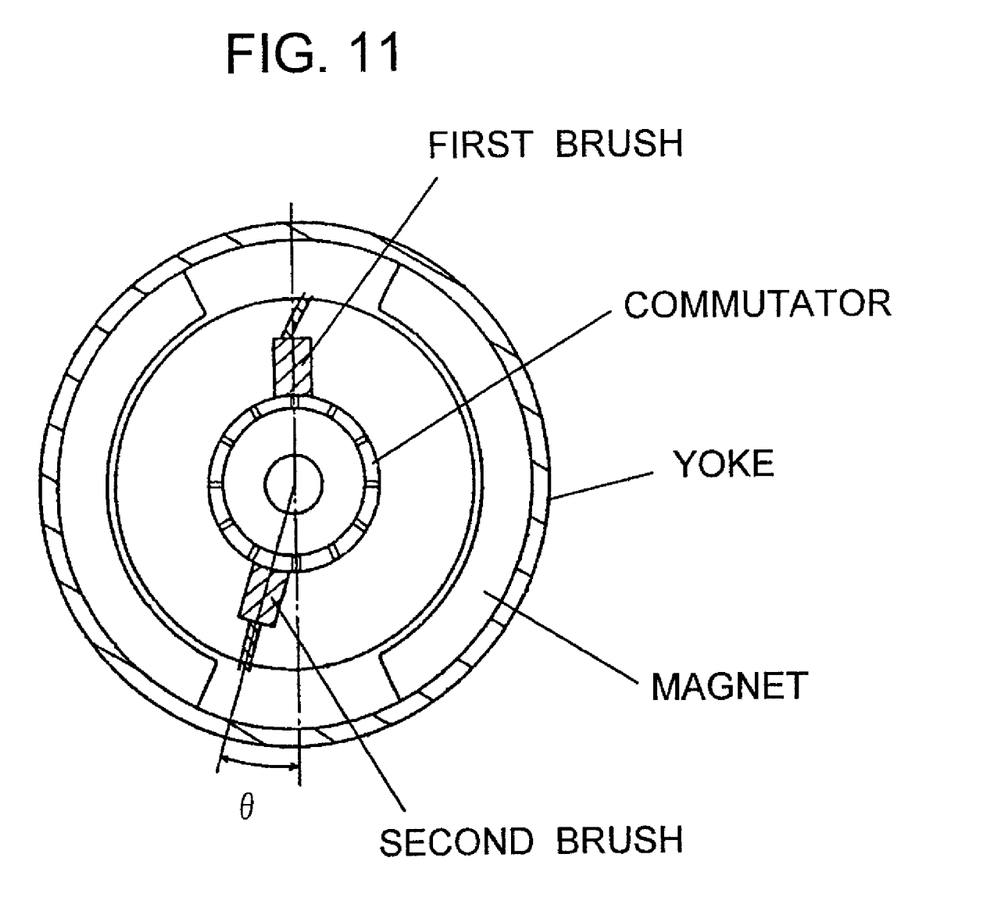
FIG. 11 is a view showing a brush structure disclosed in Patent Document 1.

FIG. 11 shows a brush structure disclosed in Patent Document 1. As illustrated, two magnets are fixed on the inner circumferential surface of a yoke. In order to yield a magnetic-noise reduction effect through reduction of magnetic excitation force, Patent Document 1 discloses a brush structure in which the center of a second brush of paired brushes in contact with a commutator is circumferentially offset by a predetermined angle θ from a circumferential position lying on a diameter passing through the center of a first brush. Patent Document 1 proposes measures against motor noise through improvement of the brush structure. However, Patent Document 1 does not disclose measures against unusual noise to be produced at the time of motor lock.

Patent Document 1: Japanese Patent Application Laid-Open (kokai) No. S62-230340

DISCLOSURE OF THE INVENTION

Problems to be Solved by the Invention

An object of the present invention is to solve the above-mentioned problems, and to reduce unusual noise to be produced from vibration of a motor induced by supply of power after the motor stops rotating by locking.

Means for Solving the Problems

A small-sized motor of the present invention comprises a casing having a closed-bottomed tubular shape; an end bell fitted to an opening portion of the casing; paired magnets attached to an inner circumferential surface of the casing and serving as stator poles; a rotor having a commutator and rotor poles formed by placing windings on respective core salients, the commutator and the rotor poles being provided on a motor shaft supported by a bearing disposed at a center of a bottom portion of the casing and by a bearing disposed at a central portion of the end bell; and a brush device fixed to the end bell and including a pair of brushes in sliding contact with the commutator. The small-sized motor is used with a stopper mechanism for mechanically stopping rotation of the motor. The pair of brushes is disposed at such a position that a line which passes through a center of the rotor and connects centers of the paired brushes is offset by a predetermined angle from a line which passes through the center of the rotor and connects centers of the paired magnets. A reference position is defined as a position of the commutator where a slit between adjacent commutator segments is located at a circumferential center of a core salient and where opposite ends of the corresponding winding wound on the core salient are connected to the respective commutator segments located on opposite sides of the slit, and the commutator is disposed at a position which is offset from the reference position by the same angle as the predetermined angle by which the pair of brushes is offset. The predetermined angle falls within a range between an angle obtained by dividing 70° by the number of pairs of stator poles and an angle obtained by dividing 290° by the number of pairs of stator poles. That is, a range of (70° to 290°)/the number of pairs of stator poles. Specifically, in the case of two stator poles, the predetermined angle falls within a range of 70° to 290° inclusive. In the case of four stator poles, the predetermined angle falls within a range of 35° to 145° inclusive.

The brush device comprises a pair of brush bases having a pair of respective receptacle terminals in contact with a pair of respective external terminals inserted from the outside of the end bell; a pair of brush arms connected to the respective brush bases and having a nature of spring; and a pair of carbon brushes attached to the respective brush arms. The carbon brushes are in sliding contact with the commutator.

EFFECT OF THE INVENTION

The present invention can reduce unusual noise to be produced from vibration of a motor induced by supply of power after the motor stops rotating by locking.

BRIEF DESCRIPTION OF THE DRAWINGS

FIGS. 1A and 1B are a pair of views showing a mechanical unit having a stopper mechanism to which the present invention is applicable, wherein

FIGS. 3A and 3B are a pair of views of an example end bell of the small-sized motor as viewed from the inside, wherein FIGS. 3A and 3B are views of the same end bell from different angles.

FIGS. 7A, 7B, and 7C are a series of views for explaining offset brush positions and offset commutator positions by use of an example motor having two stator poles and three rotor poles, wherein FIGS. 7A, 7B, and 7C show arrangements with an offset angle of 0°, 30°, and 120°, respectively, as typical examples.

FIGS. 10A, 10B, and 10C are a series of views for explaining offset brush positions and offset commutator positions by use of an example motor having four stator poles and six rotor poles, wherein FIGS. 10A, 10B, and 10C show arrangements with an offset angle of 0°, 15°, and 60°, respectively, as typical examples.

BEST MODE FOR CARRYING OUT THE INVENTION

Figure 1A:
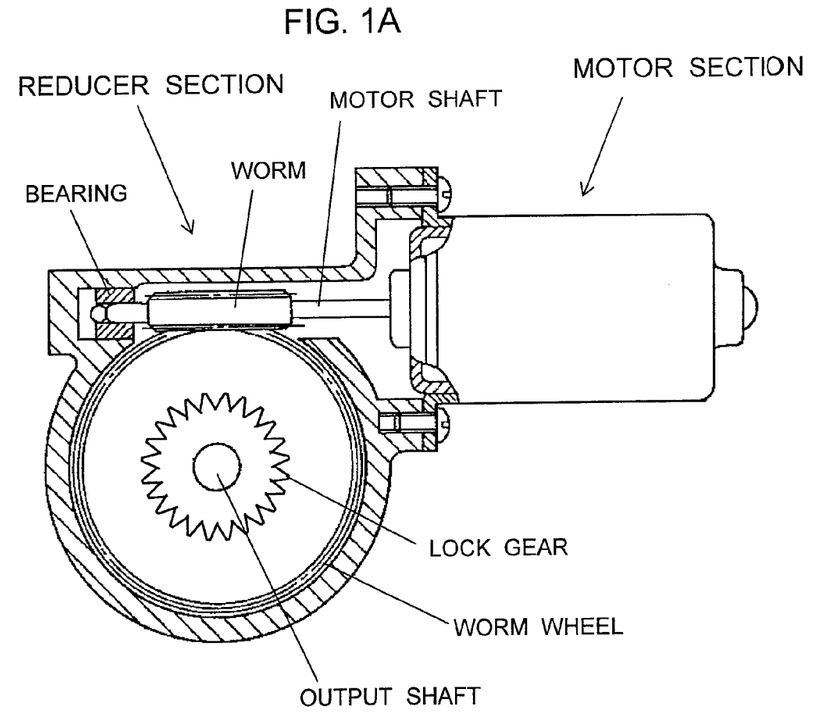
FIG. 1A is an overall view of a small-sized motor, showing, in section, a worm reducer section.
Figure 1B:
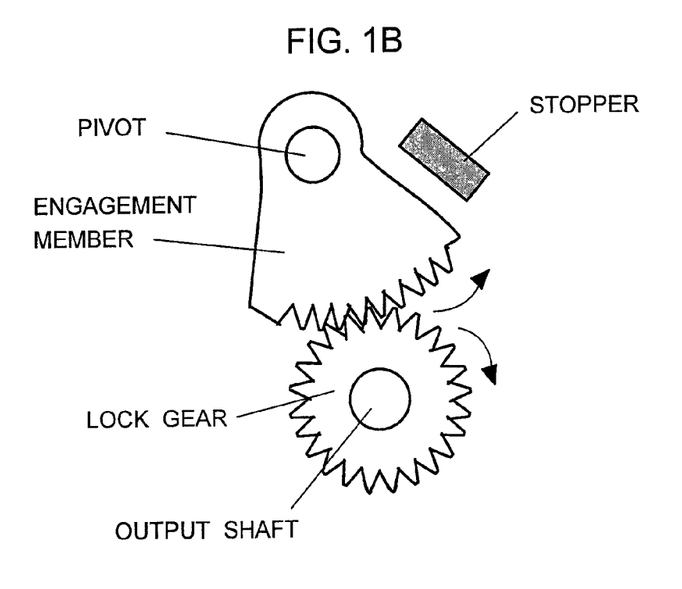
FIG. 1B is a sectional view showing, on an enlarged scale, the stopper mechanism section.

FIGS. 1A and 1B are a pair of views showing a mechanical unit having a stopper mechanism to which the present invention is applicable, wherein FIG. 1A is an overall view of a small-sized motor, showing, in section, a worm reducer section, and FIG. 1A is a sectional view showing, on an enlarged scale, the stopper mechanism section. In FIG. 1A, a motor section is attached to the reducer section. A projecting end portion of a motor shaft is supported by a bearing of the reducer section. A worm is fixed on the motor shaft. A worm wheel is meshed with the worm. A drive torque output from the motor section is transmitted from the motor shaft to the worm. In the reducer section, the drive torque is transmitted from the worm to the worm wheel and is then output from the output shaft.

In the illustrated small-sized motor, the stopper mechanism includes a lock gear, which is fixed on the output shaft and rotates together with the output shaft; an engagement member, which has gear teeth meshed with those of the lock gear and is pivotable about a pivot; and a stopper, which imposes limitation on a pivotal movement of the engagement member so as to stop the engagement member at a predetermined position. After achievement of a motor function, such as door locking, the small-sized motor stops rotating by the action of the mechanical stopper before power is turned off. That is, a motor power ON period is set such that power is turned off after elapse of a slight period of time after the motor stops rotating (the motor is locked) by the action of the mechanical stopper. The illustrated stopper mechanism locks the motor's rotation via the reducer section. Any stopper mechanism may be employed so long as the mechanism is configured to lock the motor's rotation at a predetermined position. The reducer section is not necessarily required.

Figure 2:
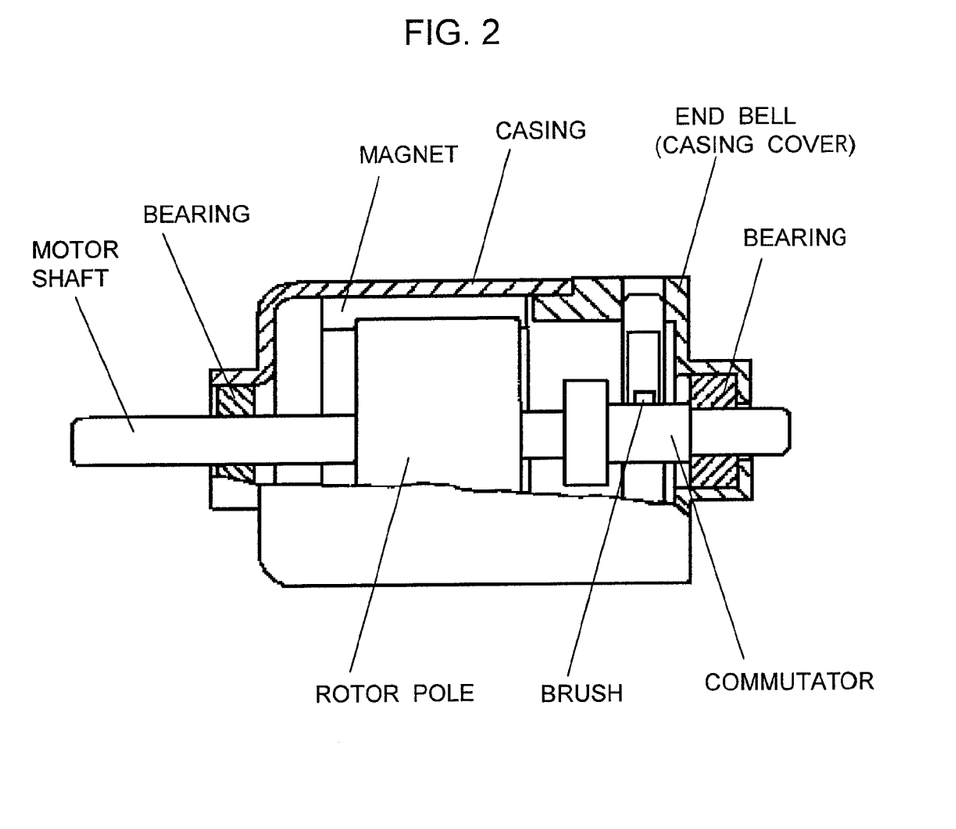
FIG. 2 is a partially sectional view showing the entirety of a small-sized motor that may be used as the motor section of FIG. 1A.

FIG. 2 is a partially sectional view generally showing a small-sized motor that may be used as the motor section of FIG. 1A. Magnets in paired arrangement serving as poles of an even number (e.g., as two poles) are attached to the inner circumferential surface of a casing, which is formed of a metal material into a closed-bottomed tubular shape. An end bell (casing cover) formed of an electrically insulative material (synthetic resin) is fitted to an opening portion of the casing for closing. A bearing for the motor shaft is housed in a central portion of the end bell.

The other end of the motor shaft is supported by a bearing provided at the center of a bottom portion of the closed-bottomed tubular casing. A commutator and rotor poles formed by placing windings on a laminated core are provided on the motor shaft as usual, thereby forming a rotor of the small-sized motor. A pair of carbon brushes in contact with the commutator is attached to a brush device fixed to the end bell.

Figure 3A:
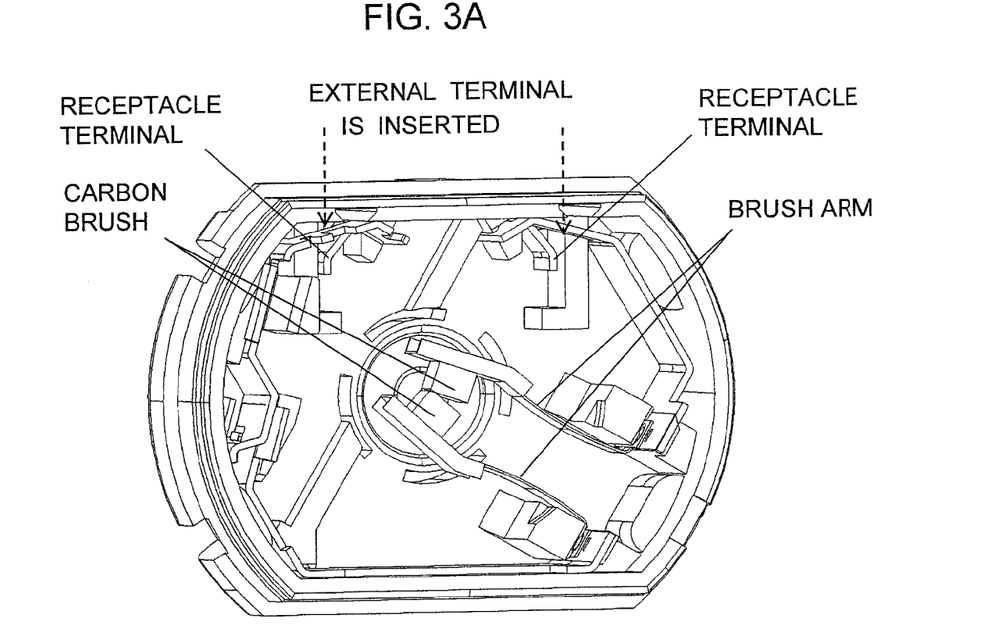
Figure 3B:
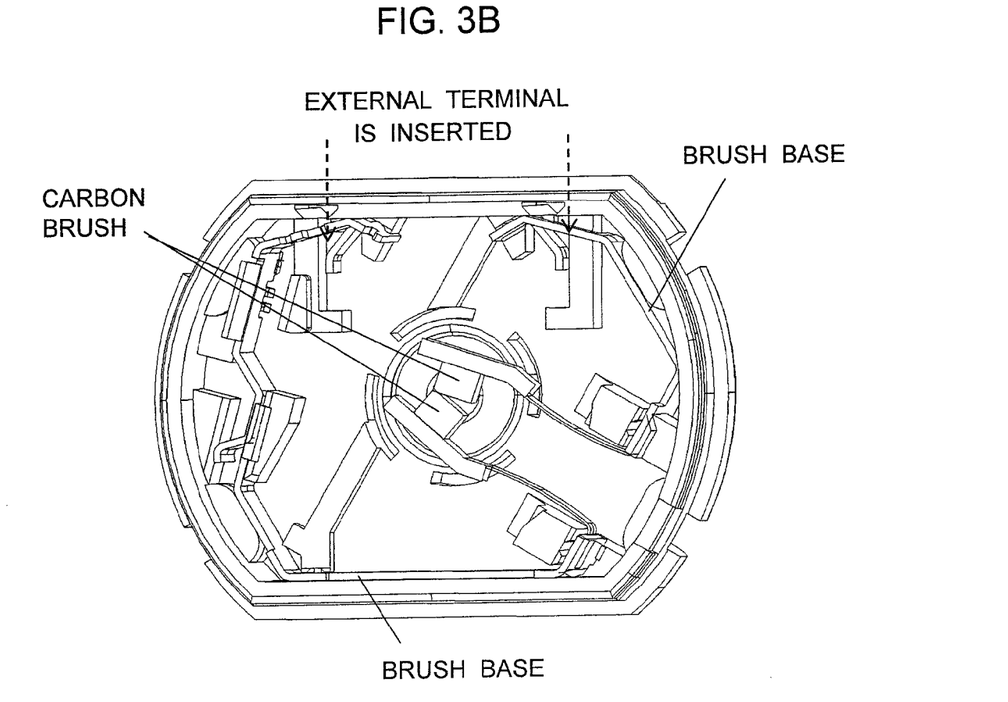

FIGS. 3A and 3B are a pair of views of an example end bell of the small-sized motor as viewed from the inside, wherein FIGS. 3A and 3B are views of the same end bell from different angles. As illustrated, the brush device includes the paired carbon brushes in sliding contact with the commutator; a pair of brush arms to which the respective carbon brushes are press-fitted for retention; a pair of brush bases connected to the respective brush arms by crimping or the like; and a pair of receptacle terminals formed integral with the respective brush bases. In this manner, in order to attain an appropriate brush pressure, the brush device is configured as follows: the carbon brushes are attached to the brush arms having the nature of a spring, and the carbon brushes are in sliding contact with the commutator of the rotor. The thus-configured brush device is assembled to the end bell made of a synthetic resin; more specifically, the brush device is press-fitted into and retained in a recess defined by columnar portions formed integral with the end bell. In order to supply power to the brush device, two external terminals are inserted into the end bell from outside through external-terminal insertion holes and are brought into electrical connection with the respective receptacle terminals.

The two magnets attached to the inner circumferential surface of the casing are disposed in the horizontal direction of FIGS. 3A and 3B. As will be described in detail later, the paired brushes are disposed such that a line which passes through the center of the rotor and connects the centers of the paired brushes is inclined by a predetermined angle with respect to a line which connects the centers of the two magnets; i.e., with respect to the horizontal direction. According to the present invention, the paired brushes are disposed while being inclined by a predetermined angle as mentioned above, thereby preventing production of unusual noise at the time of motor lock.

Figure 4:
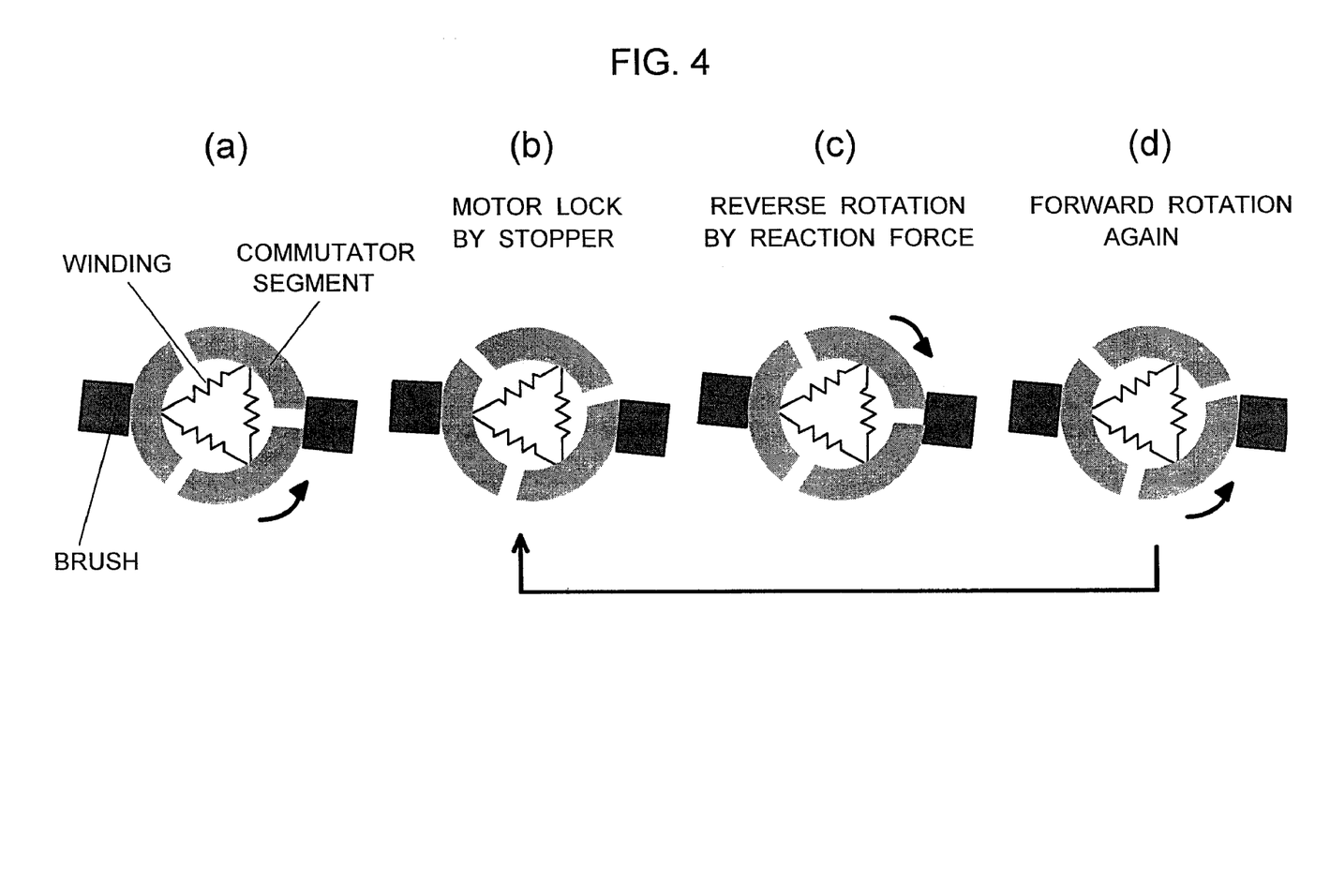
FIG. 4 is a view for explaining motor operations at various angular positions of rotation of the motor.

Next, the mechanism of unusual-noise production will be described with reference to FIG. 4. FIG. 4 is a view for explaining motor operations at various angular positions of rotation of the motor. The description refers to a motor having two stator poles and three rotor poles. However, the present invention may also be applied to a motor having four stator poles and six rotor poles.

In FIG. 4, opposite ends of each of three rotor windings are connected to corresponding adjacent commutator segments. The paired brushes are in contact with the commutator while being disposed at a 180° interval; i.e., opposite each other. The motor is assumed to rotate in the direction of the arrow from the position shown in FIG. 4(a), and then is locked through butting against the stopper at the position shown in FIG. 4(b). In this state, power is still ON. Next, as shown in FIG. 4(c), by the effect of a reaction force stemming from elasticity of the stopper mechanism including a gear made of resin, the motor rotates in reverse over a small angle. The state of FIG. 4(c) is identical with that of FIG. 4(a). Then, as shown in FIG. 4(d), the motor rotates again as a result of increase in torque. Again, as shown in FIG. 4(b), the motor is locked through butting against the stopper, resulting in the state shown in FIG. 4(b). The above-described operations are repeated.

Thus, while power is ON, the motor repeats the states shown in FIG. 4(b), (c), and (d), and magnetic force varies. Thus, the motor vibrates, thereby producing unusual noise. The motor is locked; by the effect of a reaction force, the motor rotates in reverse; and torque increases. Accordingly, the above-mentioned states are repeated. That is, when, at the time of motor lock, the angular position of rotation of the motor is a high-torque position, the motor stops at the angular position; thus, unusual noise is not produced. However, when, at the time of motor lock, the angular position of rotation of the motor is a low-torque position, the motor rotates in reverse by the effect of a reaction force. At this time, when the angular position of rotation of the motor reaches a high-torque position, unusual noise is produced as described above.

Figure 5A:
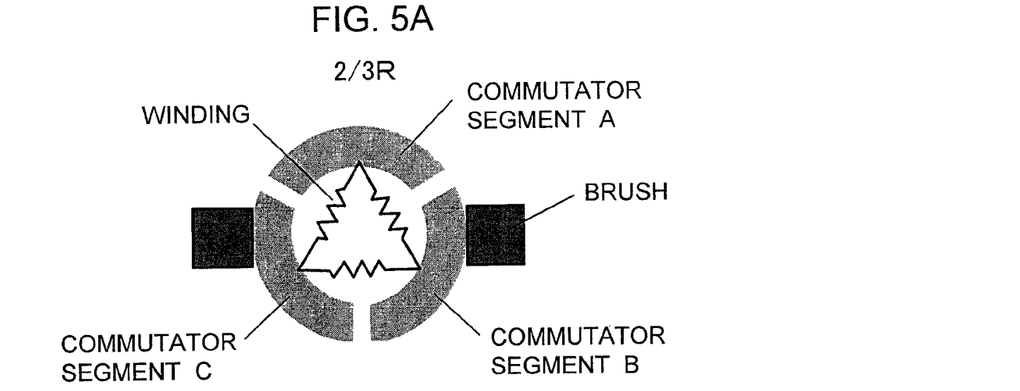
FIGS. 5A and 5B are a pair of views for explaining an increase in torque.
Figure 5B:
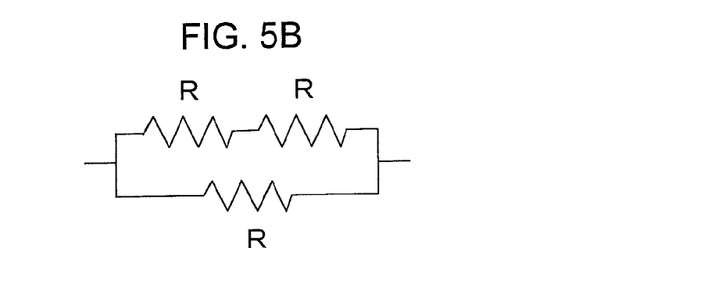

Next, an increase in torque will be described with reference to FIGS. 5A, 5B, 6A and 6B. As illustrated, three commutator segments A, B, and C are disposed with slits therebetween. Now, as shown in FIG. 5A, the paired brushes are positioned on the different commutator segments B and C, respectively. Two serially connected windings and the other winding are connected in parallel between the paired brushes. FIG. 5(B) shows an equivalent circuit diagram indicative of the state. When R represents the resistance of each winding, a combined resistance between the two brushes is ⅔ R.

Figure 6A:
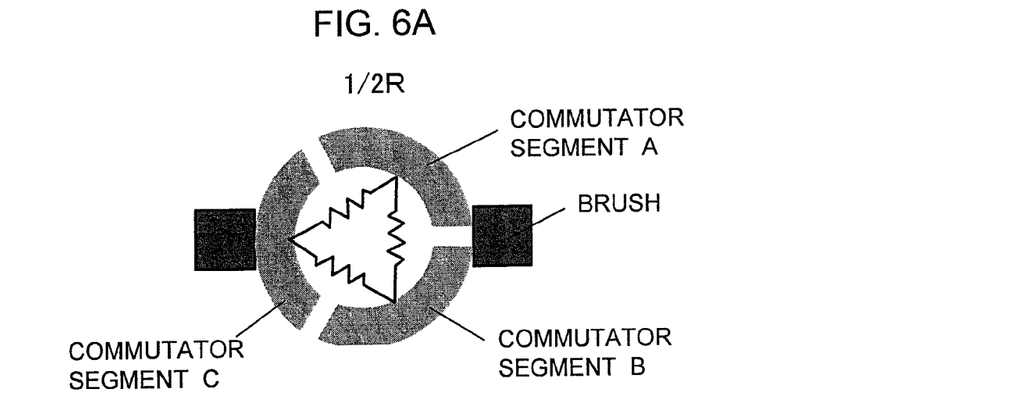
FIGS. 6A and 6B are a pair of views for explaining an increase in torque.
Figure 6B:
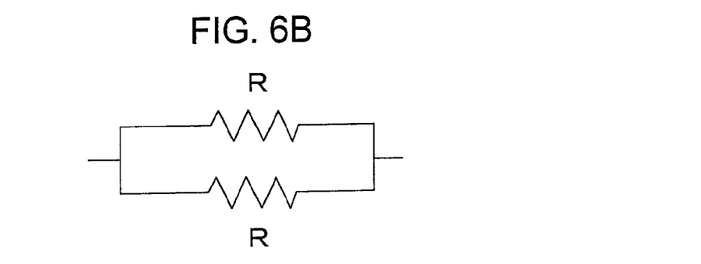

Next, suppose that the motor rotates to the state shown in FIG. 6A. At this time, one of the two oppositely disposed brushes is assumed to be positioned on the slit between the commutator segments A and B. Since one winding is short-circuited by the brush, two windings are connected in parallel between the paired brushes. FIG. 6B shows an equivalent circuit diagram indicative of the state. When R represents the resistance of each winding, a combined resistance between the two brushes is ½ R. In this manner, as compared with the angular position of FIG. 5A, the angular position of FIG. 6A is smaller in combined resistance between the two brushes and thus is greater in flowing current; i.e., torque.

When the motor is locked by the stopper, if one of the two brushes is positioned on the slit between two commutator segments, a large torque is generated, so that the motor is unlikely to rotate in reverse. By contrast, when the motor rotates in reverse by the effect of a reaction force exerted after the motor is locked by the stopper, if one of the two brushes is positioned on the slit between two commutator segments, the motor resumes rotating with a large torque. When the motor rotates in reverse by the effect of a reaction force, if the position of the brush is not on the slit between the commutator segments, torque does not increase, so that unusual noise is not produced. However, the position of the brush at the time when the motor is locked by the stopper or when the motor rotates in reverse by the effect of a reaction force is probabilistic. Therefore, in practice, it is difficult to control the rotation of the motor so as to position the brush on the slit between the commutator segments at the time of motor lock or to position the brush at a position other than on the slit between the commutator segments at the time of the reverse rotation of the motor.

The present invention prevents the production of unusual noise by means of restraining fluctuations in torque in the case where one of the two brushes is positioned on the slit between two commutator segments. Thus, according to the present invention, the paired brushes are disposed at such positions that a line which passes through the center of the rotor and connects the paired brushes is inclined by a predetermined angle with respect to a line which passes through the center of the rotor and connects the paired magnets; i.e., the brushes are disposed at positions which are offset from the line which connects the magnets. In the case where the brushes are disposed at the offset positions, using the rotor as it is causes the rectification phase to lead (or lag). Therefore, in order to maintain the rectification phase in neutral, the commutator is disposed at a position which is offset by the same angle as that by which the brushes are offset.

Figure 7A:
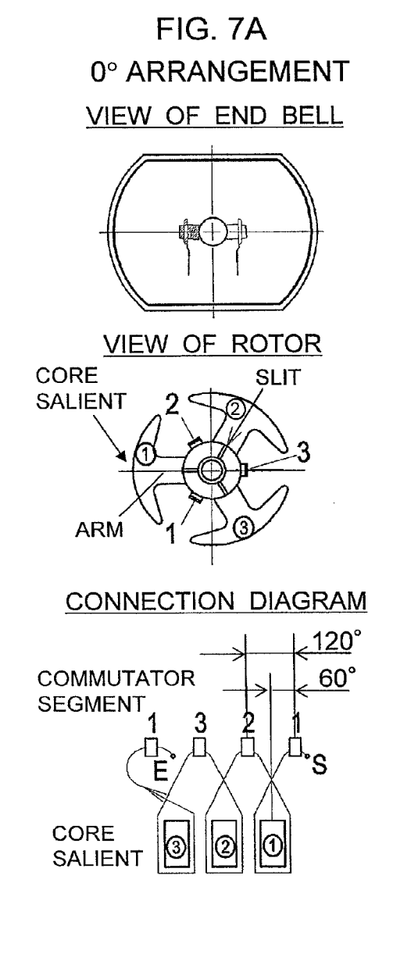
Figure 7B:
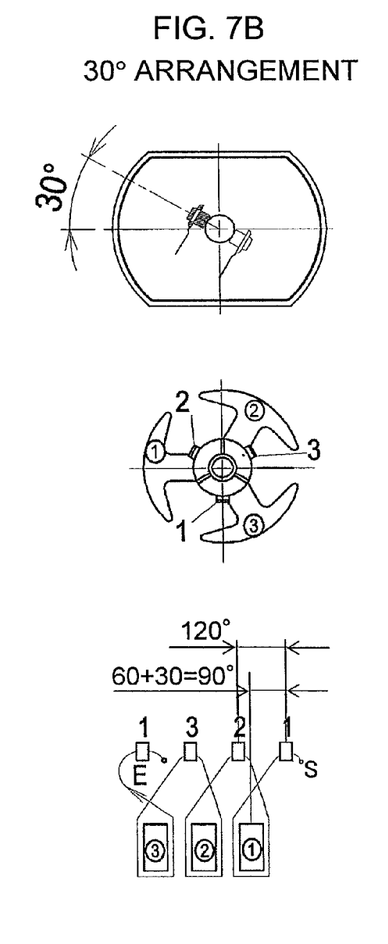
Figure 7C:
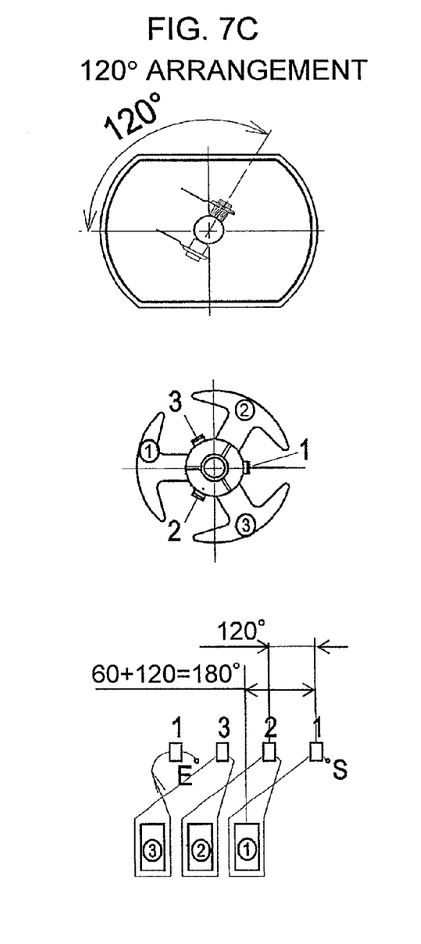

FIGS. 7A, 7B, and 7C are a series of views for explaining offset brush positions and offset commutator positions by use of an example motor having two stator poles and three rotor poles, wherein FIGS. 7A, 7B, and 7C show arrangements with an offset angle of 0°, 30°, and 120°, respectively, as typical examples. The following description is of an example motor having two (a pair of) stator poles and three rotor poles. However, the following description can be applied to a motor having four (two pairs of) stator poles and six rotor poles, by reading the angles exemplified below as one-half (½: a pair of poles/two pairs of poles) of the respective angles. In the case of four stator poles, two pairs of stator poles are disposed in such a manner that N and S poles alternate, and the poles of the pairs are disposed at angular intervals of 90° about the center of the rotor. Since an angular interval of 90° in the case of four stator poles corresponds to an angular interval of 180° in the case of two stator poles, the following description can be applied to a motor having a plurality of pairs of stator poles by reading the angles exemplified below as one-half (½: 1/the number of pairs of stator poles) of the respective angles.

The views of end bell shown in FIGS. 7A, 7B, and 7C show the arrangements of a pair of brushes as viewed from the inside of the end bell. A pair of magnets fixed in the casing is disposed at horizontally opposite sides of the interior of the casing. The views of rotor shown in FIGS. 7A, 7B, and 7C show the commutator and core salients as viewed from the end bell. Three commutator segments 1, 2, and 3 are separated from each other by slits.

In the arrangement with an offset angle of 0° shown in FIG. 7A, the paired brushes are disposed on a line which passes through the center of the rotor and connects the paired magnets; i.e., along the horizontal direction (an offset angle of 0°). The slits between the commutator segments are located at the central positions (circumferentially central positions) of arms of the core salients (indicated by circled reference numerals 1, 2, and 3). As shown in the connection diagram, winding starts from the commutator segment 1; is wound on the core salient 1; is connected to the commutator segment 2; is wound on the core salient 2; is connected to the commutator segment 3; is wound on the core salient 3; and is then connected to the initial commutator segment 1 to terminate. The angle between the commutator segments is 120°, and the slits are located at the central positions of arms of the core salients. Thus, as illustrated, the angle between the center of the commutator segment 1 and the center of the core salient 1 is 60° (hereinafter, the angle of 60° is called the reference angle). Also, a reference position means the position of the commutator arranged with an offset angle of 0° shown in FIG. 7A. In the case of the reference position, a slit between adjacent commutator segments is located at the circumferential center of a core salient on which the corresponding winding is wound, and the opposite ends of the winding are connected to the respective commutator segments located on opposite sides of the slit.

FIG. 7B shows an arrangement with an offset angle of 30°. The following description considers the angle to be offset rightward (clockwise). However, even in the case where the angle is offset leftward (counterclockwise), the same concept can be applied. The paired brushes are disposed at an angle of 30° with respect to the line which connects the paired magnets; i.e., with respect to the horizontal direction. As shown in the connection diagram, the commutator segment 1 is disposed at a position which forms an angle of 90° (reference angle 60°+30°) with respect to the center of the core salient 1. Winding which starts from and terminates at the commutator segment 1 is performed in a manner similar to the case of the arrangement with an offset angle of 0° shown in FIG. 7(A). Specifically, winding starts from the commutator segment 1; is wound on the core salient 1; is connected to the commutator segment 2; . . . ; and is then connected to the commutator segment 1 to terminate.

FIG. 7C shows an arrangement with an offset angle of 120°. The paired brushes are disposed at an angle of 120° with respect to the line which connects the paired magnets; i.e., with respect to the horizontal direction. As shown in the connection diagram, the commutator is disposed at a position which forms an angle of 180° (reference angle 60°+120°) with respect to the center of the core salient 1. Winding is performed in a manner similar to the above-mentioned case. As illustrated, in the arrangement with an offset angle of 120°, the positions of the slits between the commutator segments coincide with the centers of the arms of the core salients. Thus, the arrangement with an offset angle of 120° is characterized by good productivity. Since windings are wound about the arms of the core salients, resultant winding piles project most in the axial direction of the motor shaft at the circumferential centers of the arms. In the illustrated arrangement with an offset angle of 120°, the commutator segments are positioned at the centers between the winding piles, thereby facilitating connection of winding ends to the corresponding commutator segments. The configuration shown in FIG. 3A or 3B employs the arrangement with an offset angle of 120°.

The typical arrangements with an offset angle of 0°, 30°, and 120° have been described above with reference to FIGS. 7A, 7B, and 7C. Additionally, motors having an offset angle of 90°, 150°, 180°, 210°, 270°, and 300° were manufactured. The motors were tested for the relation between the angle and the duration of unusual noise at the time of lock. The test has revealed that, by means of disposing the brushes at an offset angle which falls within a range of 70° to 290° inclusive, the production of unusual noise can be significantly restrained.

Figure 8:
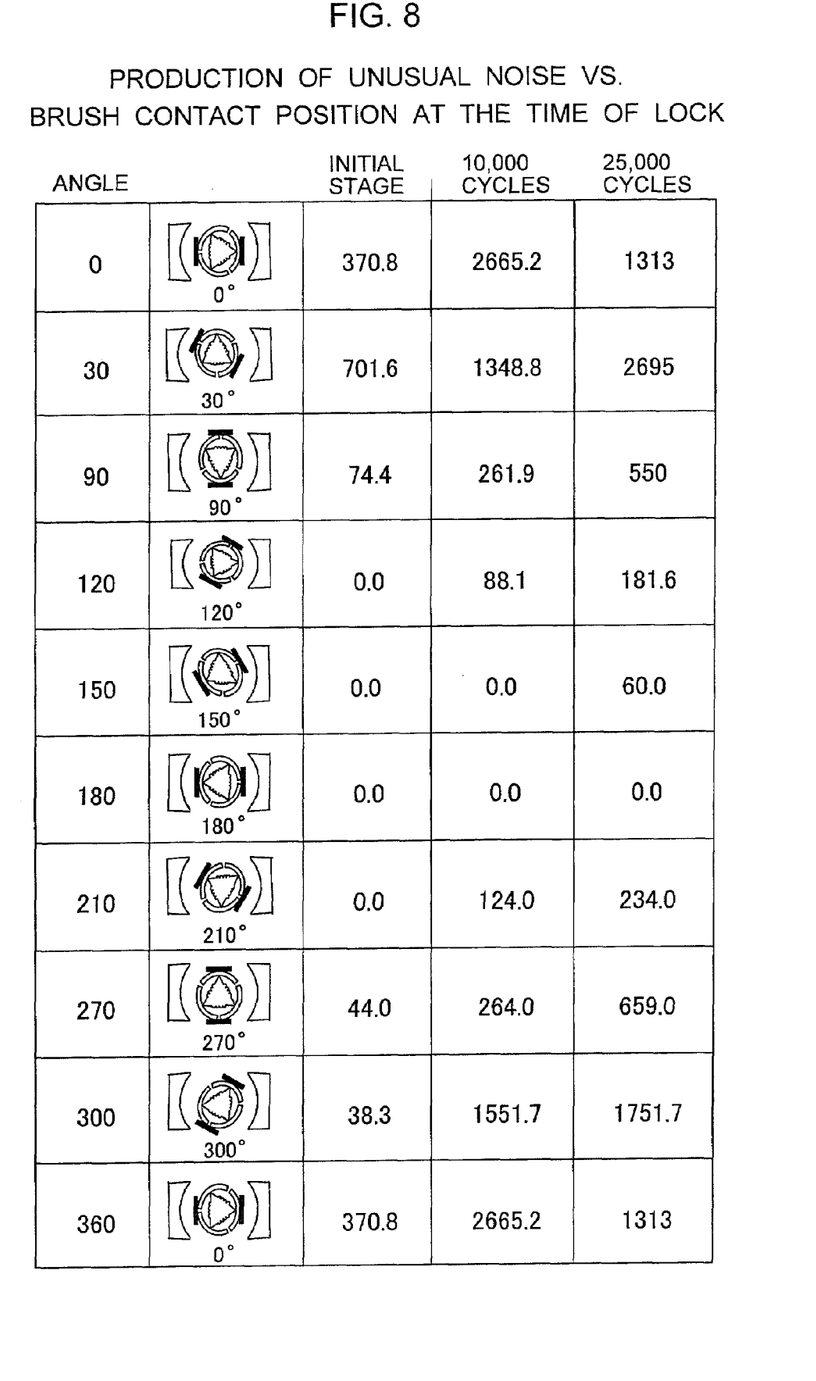
FIG. 8 is a table showing the relation between the production of unusual noise and the brush contact position at the time of lock.
Figure 9:
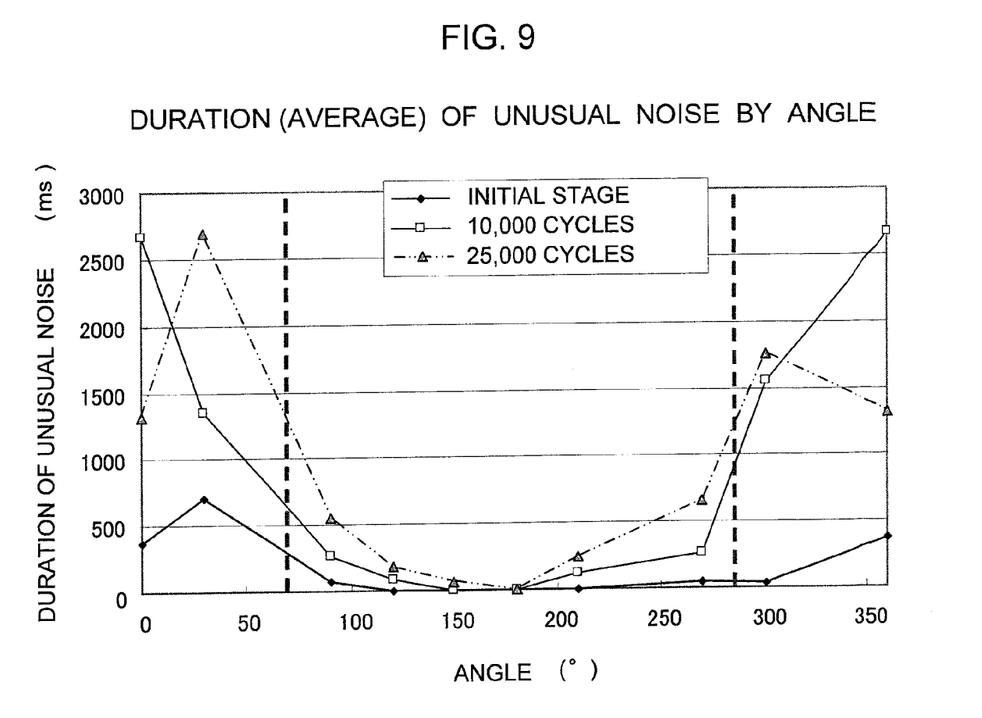
FIG. 9 is a graph prepared on the basis of the data shown in the table of FIG. 8.

FIG. 8 is a table showing the relation between the production of unusual noise and the brush contact position at the time of lock. FIG. 9 is a graph prepared on the basis of the data shown in the table of FIG. 8 and shows the duration (average) of unusual noise by angle. The test used five motors (load 4.9 mNm; current 0.6 A; speed 10,600 r/min rating) for each sample. The table shows average values of the five motors. In the test, the duration (millisecond: ms) of unusual noise within a period of two minutes was measured at the initial stage, after 10,000-cycle operation, and after 25,000-cycle operation, wherein one cycle sequentially consists of 0.2-sec forward rotation, 2.3-sec OFF, 0.2-sec reverse rotation, and 2.3-sec OFF. Test conditions (conditions of durability test): voltage between terminals 13.5 V (DC constant) and load 4.9 mNm. Environment for the test: room temperature and room humidity (about 25° C. and 60% RH).

As shown in FIGS. 8 and 9, an offset angle which falls within a range of 70° to 290° inclusive produces a marked effect on unusual noise at the time of lock. Furthermore, a range of 90° to 270° inclusive is more preferred. Particularly, the arrangement with an offset angle of 120° is characterized by good productivity as mentioned above with reference to FIG. 7(C). Notably, an offset angle of 360° coincides with an offset angle of 0°.

Figure 10A:
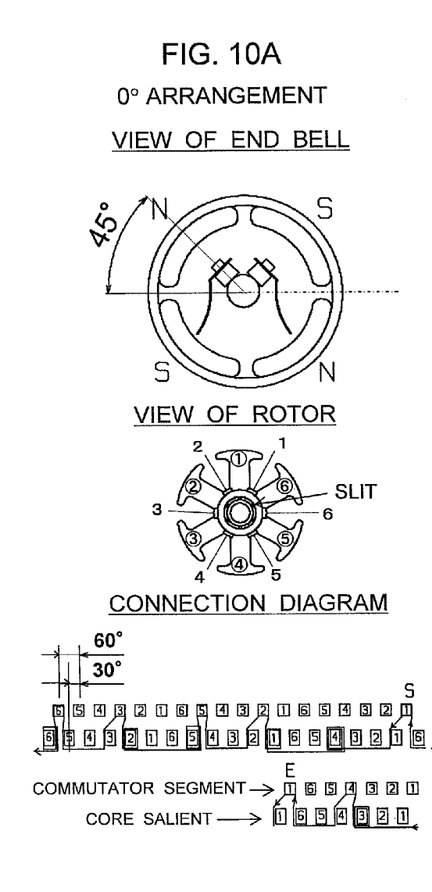
Figure 10B:
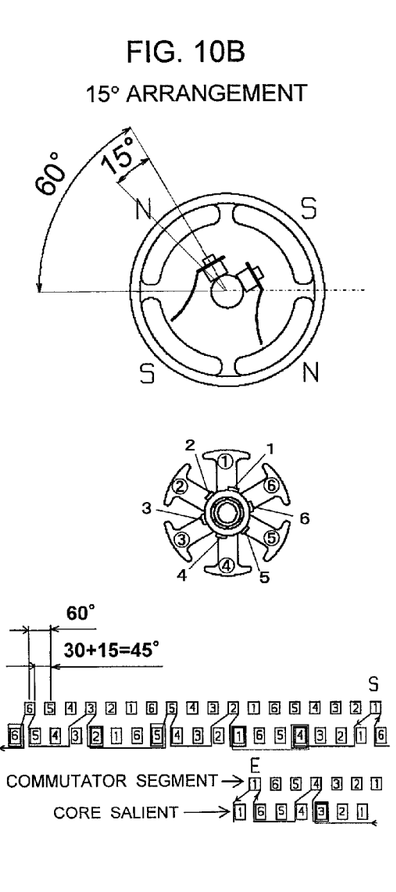
Figure 10C:
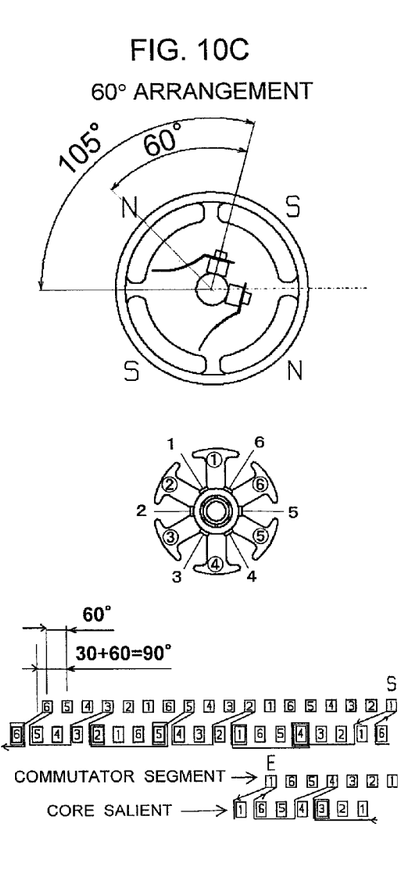

FIGS. 10A, 10B, and 10C are a series of views for explaining offset brush positions and offset commutator positions by use of an example motor having four stator poles and six rotor poles, wherein FIGS. 10A, 10B, and 10C show arrangements with an offset angle of 0°, 15°, and 60°, respectively, as typical examples. As mentioned previously, these offset angles correspond to offset angles of 0°, 30°, and 120°, respectively, of the motor having two (a pair of) stator poles and three rotor poles.

The views of end bell shown in FIGS. 10A, 10B, and 10C show the arrangements of a pair of brushes as viewed from the inside of the end bell. Two pairs of magnets fixed in the casing are disposed in such a manner that N and S poles alternate at 90° intervals about the center of the rotor. The view of rotor shown in FIG. 10 shows the commutator and core salients as viewed from the end bell. Six commutator segments 1 to 6 are separated from each other by slits.

In the arrangement with an offset angle of 0° shown in FIG. 10A, the paired brushes are disposed on two respective lines which pass through the center of the rotor with an angle of 90° therebetween and connect the paired magnets. The slits between the commutator segments are located at the central positions (circumferentially central positions) of arms of the core salients (indicated by circled reference numerals 1 to 6). As shown in the connection diagram, winding starts from the commutator segment 1 and is wound on the core salients and connected to the commutator segments in the following sequence: the core salient 4, the core salient 1, the commutator segment 2, the commutator segment 5, the core salient 5, the core salient 2, the commutator segment 3, the commutator segment 6, the core salient 6, the core salient 3, the commutator segment 4, and again the initial commutator segment 1. The angle between the commutator segments is 60°, and the slits are located at the central positions of arms of the core salients. Thus, as shown in the connection diagram, the angle between the center of the commutator segment 5 and the center of the core salient 5 is 30° (hereinafter, the angle of 30° is called the reference angle). Also, a reference position means the position of the commutator arranged with an offset angle of 0° shown in FIG. 10A (45° from the horizontal position).

FIG. 10B shows an arrangement with an offset angle of 15°. The paired brushes are disposed at a position which is offset 15° clockwise from the position shown in FIG. 10A. As shown in the connection diagram, the commutator segment 5 is disposed at a position which forms an angle of 45° (reference angle 30°+15°) with respect to the center of the core salient 5. Winding which starts from the commutator segment 1 and terminates at the commutator segment 1 is performed in a manner similar to the case of the arrangement with an offset angle of 0° shown in FIG. 10A.

FIG. 10C shows an arrangement with an offset angle of 60°. The paired brushes are disposed at a position which is offset 60° clockwise from the position shown in FIG. 10A (105° from the horizontal position). As shown in the connection diagram, the commutator segment 5 is disposed at a position which forms an angle of 90° (reference angle 30°+60°) with respect to the center of the core salient 5. Winding is performed in a manner similar to the above-mentioned case. As illustrated, in the arrangement with an offset angle of 60°, the positions of the slits between the commutator segments coincide with the centers of the arms of the core salients. Thus, the arrangement with an offset angle of 60° is characterized by good productivity.

The invention claimed is:

1. A small-sized motor comprising a casing having a closed-bottomed tubular shape; an end bell fitted to an opening portion of the casing; paired magnets attached to an inner circumferential surface of the casing and serving as stator poles; a rotor having a commutator and rotor poles formed by placing windings on respective core salients, the commutator and the rotor poles being provided on a motor shaft supported by a bearing disposed at a center of a bottom portion of the casing and by a bearing disposed at a central portion of the end bell; and a brush device fixed to the end bell and including a pair of brushes in sliding contact with the commutator, the small-sized motor being used with a stopper mechanism for mechanically stopping rotation of the motor, wherein the pair of brushes is disposed at such a position that a line which passes through a center of the rotor and connects centers of the paired brushes is offset by a predetermined angle from a line which passes through the center of the rotor and connects centers of the paired magnets;

a reference position is defined as a position of the commutator where a slit between adjacent commutator segments is located at a circumferential center of a core salient and where opposite ends of the corresponding winding wound on the core salient are connected to the respective commutator segments located on opposite sides of the slit, and the commutator is disposed at a position which is offset from the reference position by the same angle as the predetermined angle by which the pair of brushes is offset; and the predetermined angle falls within a range between an angle obtained by dividing 70° by the number of pairs of stator poles and an angle obtained by dividing 290° by the number of pairs of stator poles.

2. A small-sized motor according to claim 1, wherein the brush device comprises a pair of brush bases having a pair of respective receptacle terminals which come in contact with a pair of respective external terminals inserted from the outside of the end bell, a pair of brush arms connected to the respective brush bases and having a nature of spring, and a pair of carbon brushes attached to the respective brush arms, and the carbon brushes are in sliding contact with the commutator.

3. A small-sized motor according to claim 1, having two stator poles and three rotor poles, the predetermined angle falls within a range of 70° to 290° inclusive.

4. A small-sized motor according to claim 1, having four stator poles and six rotor poles, the predetermined angle falls within a range of 35° to 145° inclusive.

* * * * *